(12) United States Patent
Böwering

(10) Patent No.: US 11,802,890 B2
(45) Date of Patent: Oct. 31, 2023

(54) METHOD FOR AUTOMATICALLY CALIBRATING A SENSOR MODULE AND SENSOR MODULE FOR DETECTING MATERIAL CONTAINERS IN A STORAGE OR TRANSPORT SYSTEM

(71) Applicant: STEUTE TECHNOLOGIES GMBH & CO. KG, Löhne (DE)

(72) Inventor: Gabriel Böwering, Bad Oeynhausen (DE)

(73) Assignee: STEUTE TECHNOLOGIES GMBH & CO. KG, Löhne (DE)

( * ) Notice: Subject to any disclaimer, the term of this patent is extended or adjusted under 35 U.S.C. 154(b) by 298 days.

(21) Appl. No.: 17/429,160

(22) PCT Filed: Dec. 10, 2019

(86) PCT No.: PCT/EP2019/084463
§ 371 (c)(1),
(2) Date: Aug. 6, 2021

(87) PCT Pub. No.: WO2020/160816
PCT Pub. Date: Aug. 13, 2020

(65) Prior Publication Data
US 2022/0034936 A1 Feb. 3, 2022

(30) Foreign Application Priority Data

Feb. 8, 2019 (DE) .................... 10 2019 103 212.1

(51) Int. Cl.
*G01P 21/00* (2006.01)
*G01B 21/22* (2006.01)
(Continued)

(52) U.S. Cl.
CPC .............. *G01P 21/00* (2013.01); *B65G 1/023* (2013.01); *B65G 43/08* (2013.01); *G01B 21/22* (2013.01); *G01P 15/00* (2013.01)

(58) Field of Classification Search
CPC ......... G01P 21/00; G01P 15/00; B65G 1/023; B65G 43/08; G01B 21/22; G01B 7/30;
(Continued)

(56) References Cited

U.S. PATENT DOCUMENTS

| 11,131,333 B2 * | 9/2021 | Hollert | ..................... G01P 1/023 |
| 2005/0283330 A1 * | 12/2005 | Laraia | ..................... G01D 3/022 702/104 |
| 2013/0342029 A1 | 12/2013 | Mans | |

FOREIGN PATENT DOCUMENTS

| DE | 202007012926 U1 | 2/2008 |
| DE | 102010050035 A1 | 5/2012 |

(Continued)

OTHER PUBLICATIONS

International Search Report dated Apr. 14, 2020 in related/corresponding International Application No. PCT/EP2019/084463.

(Continued)

*Primary Examiner* — Brandi N Hopkins
(74) *Attorney, Agent, or Firm* — PATENT PORTFOLIO BUILDERS PLLC

(57) ABSTRACT

A method for automatically calibrating a rocker-type sensor module having a position or acceleration sensor involves measuring a position of the sensor module as an angle relative to a fixed spatial direction, and outputting an output signal that depends on whether the measured angle is less (Continued)

than or greater than a switching angle. The output signal is set to a first output value if the measured angle exceeds the switching angle. The switching angle is set to a value corresponding to the measured angle minus an "off" free pivot angle, as long as the value of the measured angle continues to increase. The output signal is set to a second output value if the measured angle falls below the switching angle. The switching angle is set to a value corresponding to the measured angle plus an "on" free pivot angle, as long as the value of the measured angle continues to fall.

8 Claims, 7 Drawing Sheets

(51) Int. Cl.
*B65G 13/00* (2006.01)
*B65G 1/02* (2006.01)
*B65G 43/08* (2006.01)
*G01P 15/00* (2006.01)

(58) Field of Classification Search
CPC ........ B60D 1/248; G01M 1/122; B07C 5/344; G01G 19/07; G07B 17/00193; G03B 27/14
See application file for complete search history.

(56) References Cited

FOREIGN PATENT DOCUMENTS

| | | |
|---|---|---|
| DE | 102011119410 A1 | 5/2013 |
| DE | 202017103459 U1 | 9/2018 |
| EP | 2930487 A1 | 10/2015 |
| WO | 2018087511 A1 | 5/2018 |
| WO | WO-2018224646 A1 * 12/2018 | ................ G01P 1/07 |

OTHER PUBLICATIONS

Search Report created Sep. 26, 2019 in related/corresponding DE Application No. 10 2019 103 212.1.
Written Opinion dated Apr. 14, 2020 in related/corresponding International Application No. PCT/EP2019/084463.

* cited by examiner

METHOD FOR AUTOMATICALLY CALIBRATING A SENSOR MODULE AND SENSOR MODULE FOR DETECTING MATERIAL CONTAINERS IN A STORAGE OR TRANSPORT SYSTEM

BACKGROUND AND SUMMARY OF THE INVENTION

Exemplary embodiments of the invention relate to a method for automatically calibrating a sensor module, which has a position or acceleration sensor, via which a position of the sensor module is measured as an angle relative to a fixed spatial direction, and which emits an output signal which depends on whether the measured angle is greater than or less than a switching angle. Exemplary embodiments of the invention further relate to a sensor module for detecting material containers in a storage or transport system. In particular, exemplary embodiments of the invention relate to such a sensor module that is capable of automatically adapting its characteristics to different installation positions.

DE 20 2017 103 459 U1 discloses a radio sensor module for detecting material containers, the sensor module has a holder and a rocker mounted pivotably therein, wherein a sensor for detecting a position of the rocker and the transmission device are arranged in the rocker. In one design of the radio sensor module, the sensor is an acceleration sensor that detects a position and/or change in position of the rocker. An evaluation unit can be arranged in the rocker, which is set up to evaluate the acceleration values measured by the acceleration sensor. In this way, the radio sensor module can directly transmit a switching position of the rocker. For this purpose, the evaluation unit is connected to the transmission device, for example, and transmits information about a position and/or a change in position of the rocker to the transmission device.

With this concept, the detection of the position or change in position is thus carried out in relation to the direction of gravity. The disadvantage is that this imposes restrictions with regard to the installation position of the sensor module, since the switching point position of the sensor module relative to its end positions changes with the inclination of the installation position. This circumstance may require readjustment of the evaluation unit from the outside in the case of inclined installation positions.

A sensor module of the type mentioned is therefore required that can be operated in different installation positions without the need for external adaptation to the respective installation position.

WO 2018/087511 A1 describes a sensor unit having an absolute direction sensor, the measured value of which is processed by a processor into a rotary position signal of a rotary element. In order for this sensor unit to provide usable processed measured values relative to the fluctuating ground even in the case of fluctuating ground, a corresponding compensation of these measured values is required. To determine the respective compensation amount, a sufficient number of measured values of the absolute direction sensor determined within a predetermined period of time is temporarily stored. In this way, a ground that fluctuates by an average position can be compensated, but the method cannot be used to adapt to different but stationary installation positions. In addition, high demands are placed on the computing power and storage capacity to be provided in the sensor unit, which necessitates a high outlay.

Exemplary embodiments of the present invention are directed to a method for an automatic calibration of a sensor module, in particular a sensor module in which a position of a rocker is detected, by means of which an automatic adaptation to an installation position of the sensor module takes place. Exemplary embodiments are also directed to a sensor module for detecting material containers in a storage or transport system, which can adapt itself to an installation position.

A method according to the invention of the type mentioned at the beginning is characterized in that the output signal is set to a first output value when the measured angle exceeds the switching angle. If the value of the measured angle then increases further, the switching angle is set to a value corresponding to the measured angle minus an off free pivot angle. If the value of the measured angle falls below the switching angle, the output signal is set to a second output value. If the measured angle then falls further, the switching angle is set to a value corresponding to the measured angle plus an on free pivot angle. The angle can be measured, for example, relative to a direction of a weight force, i.e., relative to a perpendicular.

In this way, the switching angle is automatically adapted to the actually occurring pivot angle range during the use of the sensor module designed as a rocker. The actually occurring pivot angle range depends on the installation position of the sensor module, to which the sensor module thus automatically adapts. In addition, a type of switching hysteresis is set for the sensor module with the off or on free pivot angles, which leads to safe, non-fluctuating switching states when switching.

The above-mentioned disadvantages are thus avoided by a sensor module of the type mentioned for the detection of material containers in a storage or transport system, the evaluation unit of which automatically readjusts its current switching point position with each actuation so that it lies within a predetermined range relative to the end positions.

In an advantageous design of the method, the switching angle is set to a value dependent on the measured angle only when the switching angle is exceeded by more than the off free pivot angle or is undershot by more than the on free pivot angle. Alternatively, it may also be provided to set the switching angle immediately after the switching angle is exceeded or undershot.

In a further advantageous design of the method, the size of the off free pivot angle and the size of the on free pivot angle are predetermined. They are preferably in the range of 1% to 50% and in particular in the range of 25% to 40% of a maximum possible pivot range of the sensor module.

In a further advantageous design of the method, the value of the output signal is output wirelessly in a radio method. The first and second values of the output signal correspond, for example, to the "free" and "actuated" states of the sensor module designed as a rocker.

A sensor module according to exemplary embodiments of the invention has a position or acceleration sensor via which a position of the sensor module can be measured as an angle relative to a fixed spatial direction. The sensor module further comprises an evaluation unit for a signal from the position or acceleration sensor, which outputs an output signal dependent on the measured angle. The sensor module is characterized in that the evaluation unit is set up to carry out one of the previously mentioned methods. The advantages mentioned in connection with the method are obtained: The sensor module automatically adjusts its switching point to the selected installation position.

BRIEF DESCRIPTION OF THE DRAWING FIGURES

The invention is explained in more detail below by means of an exemplary embodiment with the aid of figures, wherein.

DETAILED DESCRIPTION

Figure 1:
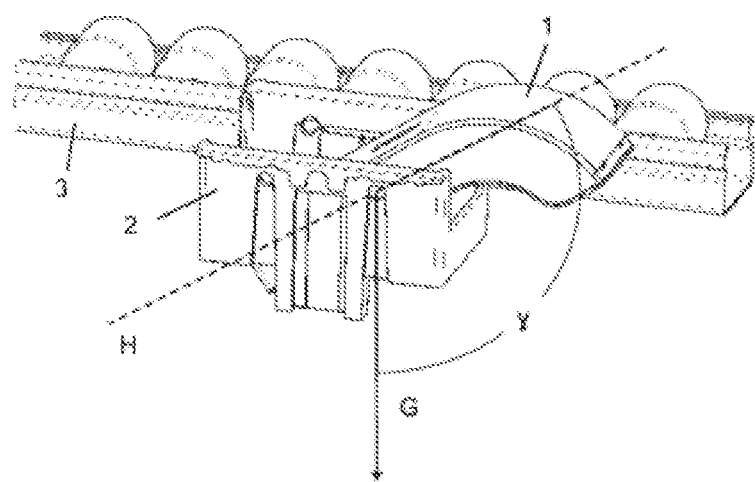
FIG. 1 shows an isometric view of an exemplary embodiment of a sensor module attached to a roller conveyor.

The exemplary embodiment of a sensor module 1 designed as a rocker shown in FIG. 1 is arranged on an inclined roller conveyor 3 by means of a holder 2. Also shown is the direction G of gravity and an angle γ between a principal plane H of the sensor module 1 and the direction G of gravity, which is indicative of the inclination of the sensor module about its bearing axis in space. The angle γ is the measured quantity of an acceleration or position sensor arranged in the sensor module 1, hereinafter referred to as sensor.

The weight distribution of the rocker, i.e., of the sensor module 1, is selected so that it assumes a rest position within the holder 2 due to gravity when not depressed. In this rest position, the rocker is shown in FIG. 1.

The position of the sensor module 1 is detected by the sensor in the form of the angle or a measured variable representing the angle, the measured value of which is converted into an output signal in an evaluation unit belonging to and integral with the sensor module 1, which signal represents an "off" or "free" state in the rest position. As soon as an object (not shown), for example a material container, is now located on the roller conveyor 3 above the rocker, this presses down the part of the rocker projecting upwards from the holder 2. This new position "pressed down" is in turn detected by the sensor arranged in the sensor module 1, whose measured value is now converted into an output signal representing an "on" or "actuated" state.

Figure 2:
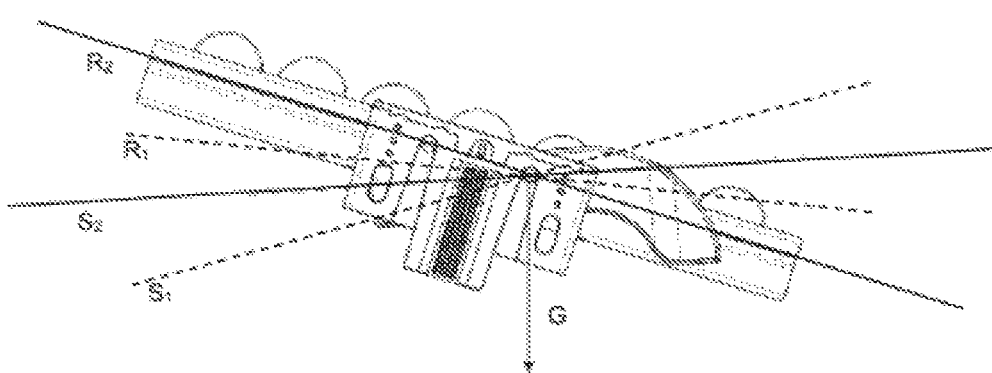
FIG. 2 shows the position of roller conveyor levels and average switching point positions on the sensor module according to FIG. 1 at two different inclinations.

FIG. 2 shows, as an example of the invention, the arrangement according to FIG. 1, which is successively aligned in two exemplary planes with a first inclination $R_1$ and with a second inclination $R_2$ of the roller conveyor. Shown are roller conveyor 3, holder 2, and sensor module 1 with the second roller conveyor inclination $R_2$, wherein the sensor module 1 is shown in a middle switching point position $S_2$. The switching point position is in each case the position at which the signaling changes from the "on" state to the "off" state or vice versa. The associated geometry is drawn in solid lines. For the sake of clarity, only the roller conveyor plane $R_1$ and a middle switching point position $S_1$ are shown in dashed lines with respect to the first inclination.

In a sensor module according to the prior art, for example according to the publication DE 20 2017 103 459 U1, it is unavoidable to manually adjust the switching point position to the installation position so that a reliable switching of the output states takes place when the rocker is pressed down.

On the other hand, a sensor module 1 according to the application is set up to exhibit the signaling behavior described in FIG. 1 even with different installation positions, e.g., with the two inclinations $R_1$ and $R_2$ of the roller conveyor plane, without the need for a separate adjustment, in particular a manual adjustment from the outside, for this purpose.

In connection with FIGS. 3a-e, the following illustrates how a sensor module 1 according to the invention automatically adapts its signaling behavior to the inclination of a roller conveyor.

As an example, it is shown how the signaling is first adapted from a delivery state to a roller conveyor inclination $R_1$. The roller conveyor inclination is then changed to a roller conveyor inclination $R_2$ and it is shown how the sensor module adapts its signaling to the inclination $R_2$.

Figure 3A:
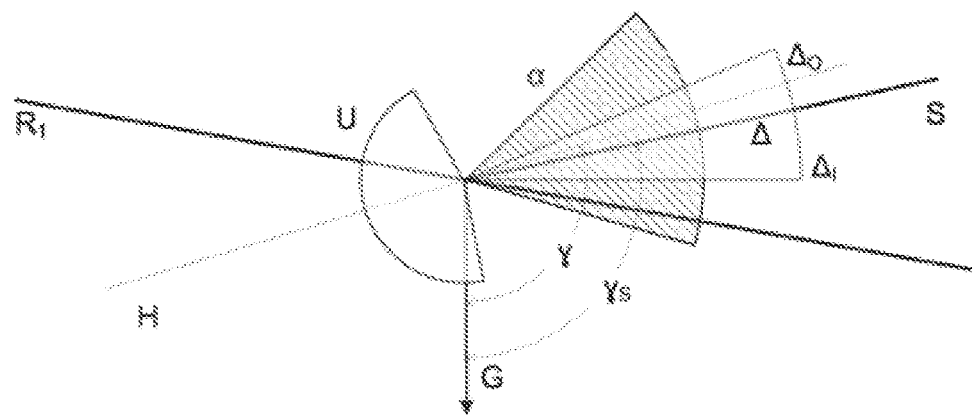
FIG. 3a-e show the switching point positions of the sensor module according to FIG. 1 as well as the associated angular ranges for different sensor module positions and inclinations of the roller conveyor plane.

In FIG. 3a, the line $R_1$ symbolizes a roller conveyor at a first roller conveyor inclination $R_1$. The sensor module according to the invention is attached to this roller conveyor in a possible delivery state in such a way that its main plane H lies in a middle range of a possible pivot range α. α is defined by the mechanical stops of the sensor module 1 in its mounting, which in practice, however, are usually not fully reached by the sensor module.

In this situation, the sensor module has a switching point position S which, for example, is preset at the factory in a delivery state or which is set randomly after a first energization of the sensor module. Around this switching point position S, the total free pivot angle Δ is spanned, which consists of the off free pivot angle $Δ_O$ on the off side of the switching point position and the on free pivot angle $Δ_I$ on the on side of the switching point position. For values of the angle γ that are in the invalid range U, the exemplary sensor module cannot be operated because of the sensor used. When using other sensors, this restriction may not exist.

In the sensor module 1, the switching point position is represented by a switching angle $γ_S$. This switching angle $γ_S$ is stored, for example, in a memory of an evaluation unit of the sensor module 1. The output signal of the sensor unit 1 with the switching states "on" or "off" is set depending on a comparison of the measured angle γ with the switching angle $γ_S$.

The following describes how the sensor module adapts to the inclination of the roller conveyor plane $R_1$ from the described delivery state. In other delivery states, in particular if the switching point position S deviates very strongly from the switching point position shown, it may be necessary to let the sensor module run through the pivot range α in both directions as far as possible in order to carry out the adaptation process completely. As the average person skilled in the art will recognize, the mode of operation is based entirely on the processes described below, which is why this case is not described separately.

After the sensor module has been mounted and commissioned, it pivots to the "released" position in the absence of a container on the roller conveyor, wherein the main plane is either already in the off free pivot angle $Δ_O$ of the sensor or enters it after the switching point position S has been exceeded. In other words, as soon as the measured angle γ exceeds the switching angle $γ_S$, the sensor module 1 outputs the output signal "off". Now, if the measured angle γ continues to increase because the rocker continues to swing up and the measured angle γ becomes larger than the switching angle $γ_S$ plus the value of the off free pivot angle $Δ_O$, the switching angle $γ_S$ is set equal to the measured angle γ minus the value of the off free pivot angle $Δ_O$. In an alternative design of the method, it is also possible to set this value immediately when the measured angle γ exceeds the switching angle $γ_S$, i.e., also when it is exceeded for the first time.

According to the application, the switching angle $\gamma_S$ is always tracked as the measured angle $\gamma$ increases, so that the off pivot angle $\Delta_O$ represents a type of (switch-on) hysteresis for the sensor module 1. The switching point position S is therefore pivoted along with it in a tracking manner at a constant distance from the main plane H. Since the total free pivot angle $\Delta$ is fixed relative to the switching point position S, this is also pivoted along with it so that, as shown in FIG. 3b, after the sensor module has been completely released, its main plane H is located close to the off-side leg of the pivot range $\alpha$ together with the leg of the off free pivot angle $\Delta_O$ facing away from the switching point position S.

Figure 3B:
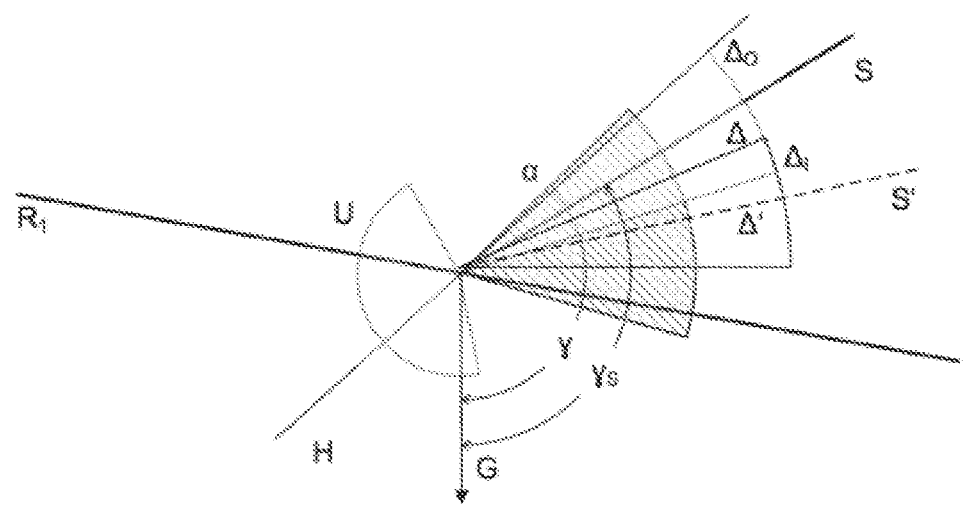

For better understanding, FIG. 3b also shows the switching point position S' and the free pivot angle $\Delta'$, which correspond to the switching point position S and the free pivot angle $\Delta$ from FIG. 3a.

If the sensor module is depressed from this position by the arrival of a container on the roller conveyor, the sensor initially retains the switching point position S. If the main plane H passes through the switching point position S during pivoting, the measured angle $\gamma$ becomes smaller than the switching angle $\gamma_S$, whereupon the output signal changes from "off" to "on". From the position of the main plane H in which the leg of the on free pivot angle $\Delta_I$ facing away from the switching point position S has been reached during further pivoting in the "depressed" direction, the switching point position S is pivoted along in a tracking manner with the main plane H at a constant distance. Or, related to the measured angle $\gamma$: As soon as the measured angle $\gamma$ becomes smaller than the switching angle $\gamma_S$ minus the on free pivot angle $\Delta_I$, the switching angle $\gamma_S$ is set to the measured angle $\gamma$ plus the on free pivot angle $\Delta_I$. Since the total free pivot angle $\Delta$ is fixed relative to the switching point position, the angle is also pivoted along so that, as shown in FIG. 3c, after the sensor module has been pressed down completely, its main plane H together with the leg of the on free pivot angle $\Delta_I$ facing away from the switching point position S is close to the on side leg of the pivot range $\alpha$.

Figure 3C:
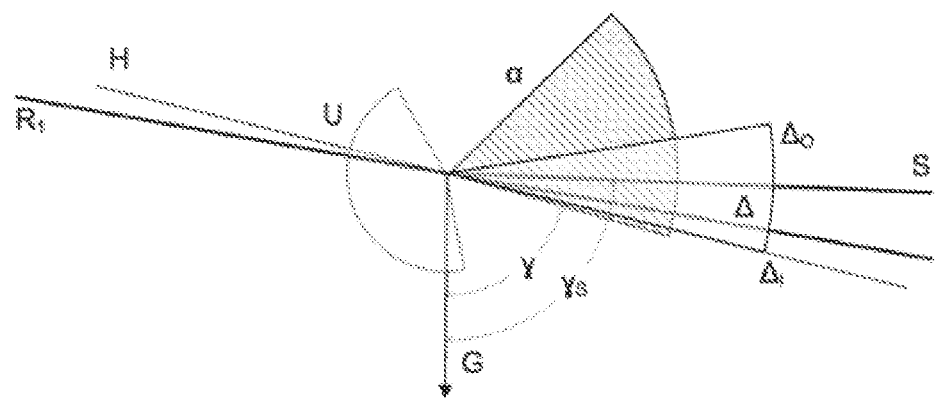
Figure 3D:
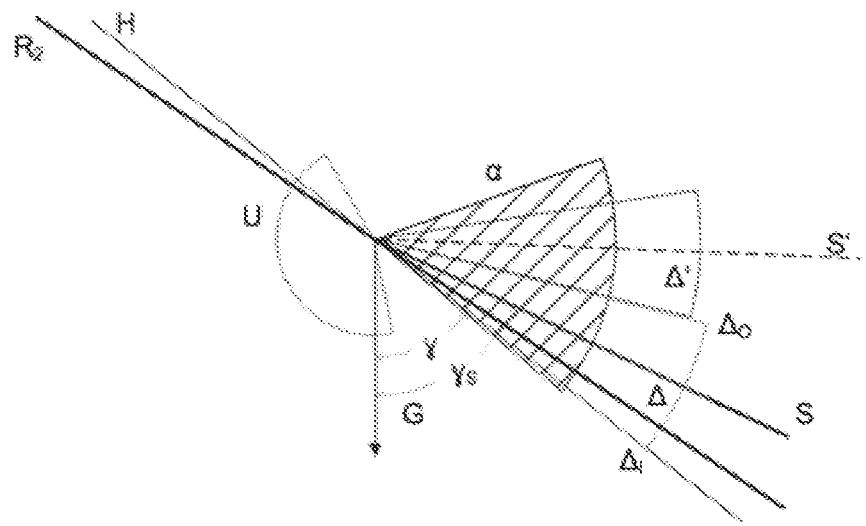

FIG. 3d shows the situation after a change of the roller conveyor plane with the sensor module depressed from the first inclination corresponding to $R_1$ to a second inclination corresponding to $R_2$. Although such a change of the roller conveyor inclination does not usually occur in practice, this example is suitable to illustrate the operation of the automatic adjustment of the sensor module.

Due to the greater inclination of the roller conveyor plane $R_2$, the angle $\gamma$ of the sensor module main plane H decreases further. The pivot range $\alpha$ is fixed relative to the roller conveyor plane and thus follows its change in inclination. The pivoting motion that the sensor module performs relative to gravity for this purpose is similar to the pivoting motion in the "depressed" direction described in connection with FIG. 3c. As there, the switching point position S, i.e., the switching angle $\gamma_S$ and the total free pivot angle $\Delta$ are also pivoted here, so that the same situation as in FIG. 3c arises relative to the roller conveyor plane $R_1$ after the inclination has been increased relative to the roller conveyor plane $R_2$.

For better understanding, FIG. 3d also shows the switching point position S' and the free pivot angle $\Delta'$, which correspond to the switching point position S and the free pivot angle $\Delta$ from FIG. 3c.

Figure 3E:
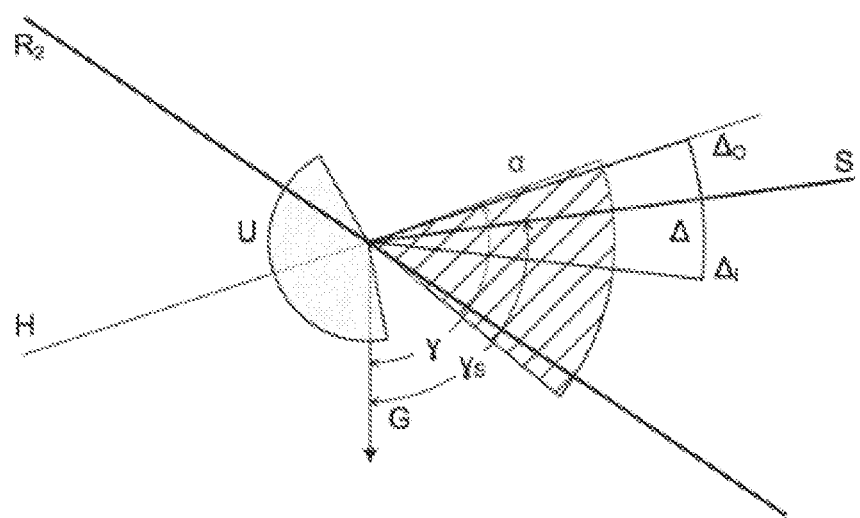

If the sensor module is released from this position by removing the container on the roller conveyor, a process similar to that described in connection with FIG. 3b results. The sensor initially retains the switching point position S. If the main plane H passes through the switching point position S during pivoting, the signal changes from "on" to "off". From the position of the main plane H in which, during further pivoting in the "released" direction, the leg of the off free pivot angle $\Delta_O$ facing away from the switching point position S has been reached, the switching point position S is also pivoted along in a tracking manner at a constant distance from the main plane H by setting the switching angle $\gamma_S$ equal to the measured angle $\gamma$ minus the off free pivot angle $\Delta_O$. Since the total free pivot angle $\Delta$ is fixed relative to the switching point position S, this is also pivoted, so that, as shown in FIG. 3e, after the sensor module has been completely released, its main plane H together with the leg of the off free pivot angle $\Delta_O$ facing away from the switching point position S is located close to the off side leg of the pivot range $\alpha$.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Sensor module
2 Holder
3 Roller conveyor
H Main plane of sensor module
G Weight force
$\gamma$ Measured angle between main plane of sensor module and direction of weight force
$\gamma_S$ Switching angle
$R_1$ Roller conveyor plane with a first inclination
$R_2$ Roller conveyor plane with a second inclination
$S_1$ Middle switching point position for roller conveyor plane with a first inclination
$S_2$ Middle switching point position for roller conveyor plane with a second inclination
S Switching point position
S' Previous switching point position
$\alpha$ Possible pivot range of the sensor module
$\Delta$ Total free pivot angle
$\Delta'$ Total free pivot angle according to previous figure
$\Delta_O$ Off free pivot angle
$\Delta_I$ On free pivot angle
U Invalid range

The invention claimed is:
1. A method for automatically calibrating a sensor module formed as a rocker, the sensor module having which has a position or acceleration sensor, the method comprising:
measuring, by the sensor module, a position of the sensor module as an angle relative to a fixed spatial direction;

outputting, by the sensor module, an output signal that depends on whether the measured angle is greater than or less than a switching angle;

setting the output signal to a first output value responsive to the measured angle exceeding the switching angle;

setting the switching angle to a value equal to the measured angle minus an off free pivot angle as long as a value of the measured angle continues to increase;

setting the output signal to a second output value responsive to the measured angle falling below the switching angle; and setting the switching angle to a value corresponding to the measured angle plus an on free pivot angle as long as the value of the measured angle continues to decrease.

2. The method of claim 1, wherein the setting of the switching angle to the value equal to the measured angle minus an off free pivot angle only occurs when the switching angle is exceeded by more than the off free pivot angle, and wherein the setting of the switching angle to the value corresponding to the measured angle plus an on free pivot angle only occurs when the switching angle is undershot by more than the on free pivot angle.

3. The method of claim 1, wherein the setting of the switching angle to the value equal to the measured angle minus an off free pivot angle and to the value corresponding to the measured angle plus an on free pivot angle occurs immediately after the switching angle is exceeded or undershot, respectively.

4. The method of claim 1, wherein a magnitude of the off free pivot angle and a magnitude of the on free pivot angle are predetermined.

5. The method of claim 4, wherein the magnitude of the off free pivot angle and the magnitude of the on free pivot angle are in a range of 25% to 40% of a maximum possible pivot range of the sensor module.

6. The method of claim 1, wherein the measured angle is measured relative to a direction of a weight force.

7. The method of claim 1, wherein the output signal is output wirelessly.

8. A sensor module for detecting material containers in a storage or transport system, the sensor module comprising:

a position or acceleration sensor, via which a position of the sensor module can be measured as an angle relative to a fixed spatial direction; and an evaluation unit that evaluates a signal of the position or acceleration sensor and that outputs an output signal as a function of the measured angle, wherein the evaluation unit is configured to set the output signal to a first output value responsive to the measured angle exceeding the switching angle;

set the switching angle to a value equal to the measured angle minus an off free pivot angle as long as a value of the measured angle continues to increase;

set the output signal to a second output value responsive to the measured angle falling below the switching angle; and set the switching angle to a value corresponding to the measured angle plus an on free pivot angle as long as the value of the measured angle continues to decrease.

* * * * *